United States Patent
Post

[11] Patent Number: 6,111,332
[45] Date of Patent: Aug. 29, 2000

[54] COMBINED PASSIVE BEARING ELEMENT/ GENERATOR MOTOR

[75] Inventor: Richard F. Post, Walnut Creek, Calif.

[73] Assignee: The Regents of the University of California, Oakland, Calif.

[21] Appl. No.: 09/017,930

[22] Filed: Feb. 3, 1998

[51] Int. Cl.[7] .............................. H02K 7/09; H02K 7/02; H02K 21/12
[52] U.S. Cl. ......................... 310/90.5; 310/74; 310/156
[58] Field of Search .................................. 310/90.5, 113, 310/156, 112, 74

[56] References Cited

U.S. PATENT DOCUMENTS

| | | | |
|---|---|---|---|
| 3,572,854 | 3/1971 | Danby | 310/90.5 |
| 3,683,216 | 8/1972 | Post | 310/74 |
| 4,091,687 | 5/1978 | Meinke et al. | 310/90.5 |
| 4,959,560 | 9/1990 | Stokes | 310/51 |
| 5,208,522 | 5/1993 | Griepentrog et al. | 310/90.5 |
| 5,481,146 | 1/1996 | Davey | 310/90.5 |
| 5,495,221 | 2/1996 | Post | 310/90.5 |
| 5,525,848 | 6/1996 | Pinkerton et al. | 310/90 |
| 5,572,079 | 11/1996 | Pinkerton | 310/90.5 |
| 5,669,470 | 9/1997 | Ross | 191/10 |
| 5,705,902 | 1/1998 | Merritt et al. | 310/156 |
| 5,847,480 | 12/1998 | Post | 310/90.5 |
| 5,905,321 | 5/1999 | Clifton et al. | 310/178 |

*Primary Examiner*—Clayton LaBalle
*Attorney, Agent, or Firm*—John P. Wooldridge; Alan H. Thompson

[57] ABSTRACT

An electric machine includes a cylindrical rotor made up of an array of permanent magnets that provide a N-pole magnetic field of even order (where N=4, 6, 8, etc.). This array of permanent magnets has bars of identical permanent magnets made of dipole elements where the bars are assembled in a circle. A stator inserted down the axis of the dipole field is made of two sets of windings that are electrically orthogonal to each other, where one set of windings provides stabilization of the stator and the other set of windings couples to the array of permanent magnets and acts as the windings of a generator/motor. The rotor and the stator are horizontally disposed, and the rotor is on the outside of said stator. The electric machine may also include two rings of ferromagnetic material. One of these rings would be located at each end of the rotor. Two levitator pole assemblies are attached to a support member that is external to the electric machine. These levitator pole assemblies interact attractively with the rings of ferromagnetic material to produce a levitating force upon the rotor.

15 Claims, 3 Drawing Sheets

COMBINED PASSIVE BEARING ELEMENT/ GENERATOR MOTOR

The United States Government has rights in this invention pursuant to Contract No. W-7405-ENG48 between the United States Department of Energy and the University of California for the operation of Lawrence Livermore National Laboratory.

BACKGROUND OF THE INVENTION

1. Field of the Invention

The present invention relates to magnetic bearing elements, and more specifically, it relates to a means for combining the functions of a passive magnetic bearing system with that of a generator/motor.

2. Description of Related Art

Klaus Halbach has investigated many novel designs for permanent magnet arrays, using advanced analytical approaches and employing a keen insight into such systems. One of his motivations for this research was to find more efficient means for the utilization of permanent magnets for use in particle accelerators and in the control of particle beams. As a result of his pioneering work, high power free-electron laser systems became feasible, and his arrays have been incorporated into other particle-focusing systems of various types.

In August 1979, K. Halbach authored a paper entitled "Design of Permanent Multipole Magnets with Oriented Rare Earth Cobalt Material." In this paper, he presented a novel method of generating multipole magnetic fields using non-intuitive geometrical arrangements of permanent magnets. In subsequent publications, he further defined these concepts.

The present inventor incorporated some of the concepts studied by Klaus Halbach in an "inside-out" design, where the rotating portion, i.e., the rotor, is on the outside of the stator. See U.S. Pat. No. 5,705,902. The stationary portion, i.e., stator, is formed by the inside of the machine and is inserted down the axis of the dipole field. The cylindrical rotor contains an array of identical permanent magnets that provide a uniform dipole field. The windings of the motor are placed in or on the stator. The stator windings are then "switched" or "commutated" to provide a DC motor/generator much the same as in a conventional DC motor. The commutation can be performed by mechanical means using brushes or by electronic means using switching circuits. The cited invention is useful in electric vehicles and adjustable speed DC drives.

Electric vehicle drive motors need to be rugged, low loss, and easy to control. A DC motor in general is easier to control than an AC motor. The Halbach array allows for the construction of an "ironless" motor thereby eliminating hysteresis and eddy current losses creating a very efficient motor. Efficiencies greater than 95 percent are possible. In conventional motors/generators using iron, the narrowness of the airgap between stator and rotor dominates the machine design. Since the Halbach array provides a uniformly distributed magnetic field and one not requiring the use of narrow-gapped iron pole faces, the size of the airgap is no longer an important design parameter. This allows the motor design to be insensitive to airgap size allowing looser tolerances, which then provides for a less expensive, more rugged design. The more rugged, less expensive design coupled with greatly increased efficiency makes this a nearly ideal design for many applications.

Motor and generator armatures, flywheel rotors, and other rotatable components have conventionally been supported and constrained against radially and axially directed forces by mechanical bearings, such as journal bearings, ball bearings, and roller bearings. Such bearings necessarily involve mechanical contact between the rotating element and the bearing components, leading to problems of friction and wear that are well known. Even non-contacting bearings, such as air bearings, involve frictional losses that can be appreciable, and are sensitive to the presence of dust particles. In addition, mechanical bearings, and especially air bearings, are poorly adapted for use in a vacuum environment.

The use of magnetic forces to provide a non-contacting, low friction equivalent of the mechanical bearing is a concept that provides an attractive alternative, one which is now being exploited commercially for a variety of applications. All presently available commercial magnetic bearing/suspension elements are subject to limitations, arising from a fundamental physics issue, that increase their cost and complexity. These limitations make the conventional magnetic bearing elements unsuitable for a wide variety of uses where complexity-related issues, the issue of power requirements, and the requirement for high reliability are paramount.

The physics issue referred to is known by the name of Earnshaw's Theorem. According to Earnshaw's Theorem (when it is applied to magnetic systems), any magnetic suspension element, such as a magnetic bearing that utilizes static magnetic forces between a stationary and a rotating component, cannot exist stably in a state of equilibrium against external forces, e. g. gravity. In other words if such a bearing element is designed to be stable against radially directed displacements, it will be unstable against axially directed displacements, and vice versa. The assumptions implicit in the derivation of Earnshaw's Theorem are that the magnetic fields are static in nature (i. e. that they arise from either fixed currents or objects of fixed magnetization) and that diamagnetic bodies are excluded.

The almost universal response to the restriction imposed by Earnshaw's Theorem has been the following: Magnetic bearing elements are designed to be stable along at least one axis, for example, their axis of symmetry, and then external stabilizing means are used to insure stability along the remaining axes. The "means" referred to could either be mechanical, i.e., ball bearings or the like, or, more commonly, electromagnetic. In the latter approach magnet coils are employed to provide stabilizing forces through electronic servo amplifiers and position sensors that detect the incipiently unstable motion of the rotating element and restore it to its (otherwise unstable) position of force equilibrium.

Less common than the servo-controlled magnetic bearings just described are magnetic bearings that use superconductors to provide a repelling force acting against a permanent magnet element in such a way as to stably levitate that magnet. These bearing types utilize the flux-excluding property of superconductors to attain a stable state, achieved by properly shaping the superconductor and the magnet so as to provide restoring forces for displacements in any direction from the position of force equilibrium. Needless to say, magnetic bearings that employ superconductors are subject to the limitations imposed by the need to maintain the superconductor at cryogenic temperatures, as well as limitations on the magnitude of the forces that they can exert, as determined by the characteristics of the superconductor employed to provide that force.

The magnetic bearing approaches that have been described represent the presently commonly utilized means for creating a stable situation in the face of the limitations imposed by Earnshaw's Theorem. The approach followed by the first one of these (i.e., the one not using superconducting materials) is to overcome these limitations by introducing other force-producing elements, either mechanical, or electromagnetic in nature, that restore equilibrium. The latter, the servo-controlled magnetic bearing, is usually designated as an "active" magnetic bearing, referring to the active involvement of electronic feedback circuitry in maintaining stability.

The magnetic bearing approach employed in this invention is of a different type than either of the just-described approaches. It is of a type that might be called an "ambient-temperature passive magnetic bearing." This type of bearing, of the type described in U.S. Pat. No. 5,495,221, employs permanent magnet and other elements, together with dynamic effects, to overcome the limitations of Earnshaw's Theorem.

SUMMARY OF THE INVENTION

It is an object of the present invention to combine the functions of a passive magnetic bearing with a generator/motor.

The present invention is based on a cylindrical rotor that includes an array of permanent magnets that provide an N-pole magnetic field of even order (where N=4, 6, 8, etc., i.e., quadrupole, sextuple, etc.). By combining a circular Halbach array and a special set of windings coupled magnetically to the Halbach array, a strong radially stabilizing action with minimal power losses is produced. Power losses are minimized by cross-coupling windings involving conductors that are located azimuthally apart from each other. The Halbach array has an even number (greater than two) of wavelengths around its inner circumference. In such a field, when the axis of the Halbach array (which may be rotating) coincides with the axis of symmetry of the winding set, the voltages induced in the conductors of the cross-coupled windings when properly configured cancel each other exactly so that no current flows. When the axes are displaced from each other, cancellation no longer occurs, current flows, and a centering action results.

The present invention adds a new set of windings, wound within the same structure, to the special set of windings mentioned above, and connected so that their voltages add in phase at the output leads, so that power can be drawn from them, or they can be used as motor windings to spin up the rotor to which they are attached. The windings may be configured to produce either a single-phase or a multiple-phase output, depending on the application. In the case of these new windings, the opposite rule for their interconnection would apply as compared to the first set, with respect to transposition upon series connection. In this way the voltages from opposite-sided windings would be caused to add, rather than to cancel.

While the suggested application described here is to an electromechanical battery, the same technique could be applied to the design of a much-simplified electric generator/motor, where one set of the windings provides magnetic levitation, while the other acts as the windings of a generator motor, coupling to a rotating Halbach array. In such a case it could be advantageous to invert the structural arrangement. This radially-inverted rotating Halbach array (field maximized on the outside of the array) would be located inside of a dual set of stationary windings that provide both levitation and energy coupling. In either case it would also be necessary to provide axial centering, using permanent-magnet elements such as those described in the incorporated patents.

The invention can be summarized as an electric machine which includes a cylindrical rotor made up of an array of permanent magnets that provide a N-pole magnetic field of quadrupolar or higher (N=4, 6, etc.) even order. This array of permanent magnets has bars of identical permanent magnets made of dipole elements where the bars are assembled in a circle. Each bar has a vector direction of magnetization that rotates at N times the rate as that of a vector rotating about the circle pointing from the center of the N-pole field to the center of the dipole elements. A stator inserted down the axis of the multipole field is made of two sets of windings that are electrically orthogonal to each other, in that one set of windings, the one that employs flux-cancellation achieved through its configuration, provides stabilization of the stator, while the other set of windings, in coupling to the array of permanent magnets, acts as the windings of a generator/motor. The rotor and the stator are typically horizontally disposed, and the rotor is on the outside of said stator.

When horizontally disposed, the electric machine may also include two rings of ferromagnetic material. One of these rings is located at each end of the rotor. Two levitator pole assemblies are attached to a support member that is external to the electric machine. These levitator pole assemblies interact attractively with the rings of ferromagnetic material to produce a levitating force upon the rotor.

DETAILED DESCRIPTION OF THE INVENTION

Figure 1A:
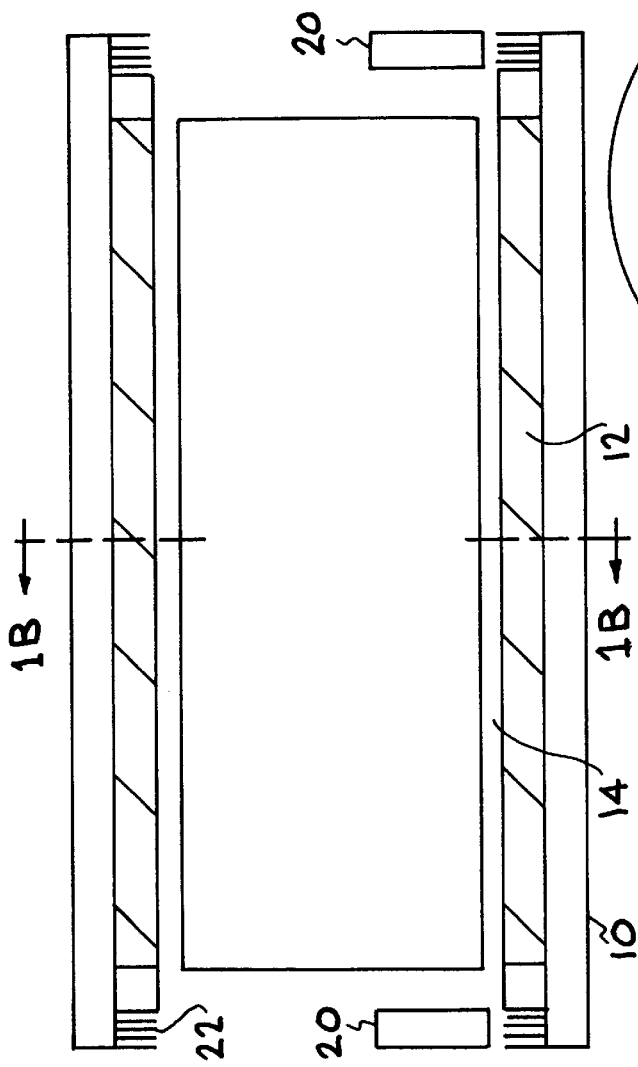
FIG. 1A shows a side view of the combined passive bearing and Halbach-Array motor/generator.
Figure 1B:
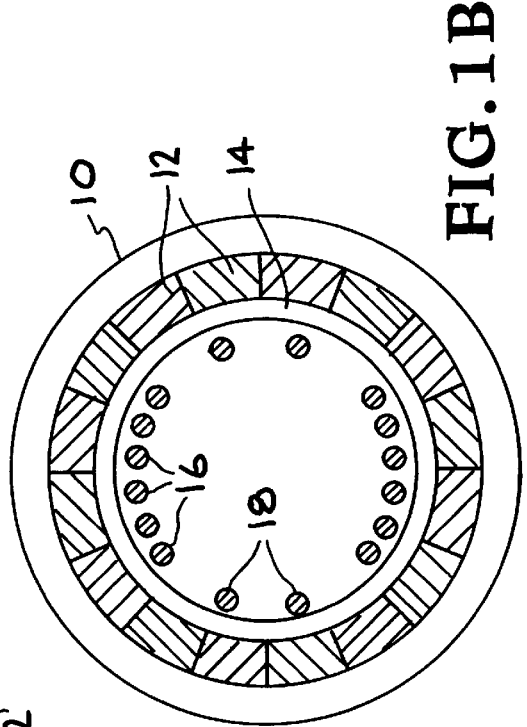
FIG. 1B shows a sectional view of the combined passive bearing and Halbach-Array motor/generator.

There are applications for the electromechanical battery where it would be of economic value to combine the functions of a passive magnetic bearing, such as that described in the U.S. Pat. No. 5,495,221 titled "Dynamically Stable Magnetic Suspension/Bearing System" (R. F. Post), incorporated herein by reference, with a generator/motor action at modest power levels. The present invention includes a method of achieving this objective. U.S. Pat. No. 5,705,902 titled "Halbach Array DC Motor/Generator", incorporated herein by reference, discusses embodiments of a dipole generator/motor. The present invention is based on a higher-order pole generator/motor.

The combination of a circular multipole Halbach array and a special set of windings coupled magnetically to the Halbach array can produce a strong radially stabilizing action with minimal power losses. Power losses are minimized by cross-coupling windings that are located 180° azimuthally apart from each other. The windings employed could either be of the form of rectangular "window frames" lying transversely across the stator, or they could be of the "lap-wound" variety, lying on the surface of the stator support structure. The Halbach array has an even number (greater than 2) of wavelengths around its inner circumference. When the axis of the Halbach array (which may be rotating) coincides with the axis of symmetry of the winding set, the voltages induced in the two legs of the windings, when properly connected to each other, cancel each other exactly so that no current flows. However, when the axes are displaced from each other, flux cancellation no longer occurs, circulating currents will flow, and a centering action results, similar to that described in U.S. patent application Ser. No. 08/552,446 "Passive Magnetic Bearing Element with Minimal Power Losses," incorporated herein by reference.

The invention here consists in adding to the aforementioned winding set a new set of windings, wound within the same structure, connected so that their voltages add in phase at the output leads, allowing power to be drawn from them, or allowing them to be used as motor windings to spin up the rotor to which they are attached. The windings may be configured to produce either a single-phase or a multiple-phase output, depending on the application. In the case of these new windings, the opposite rule for their interconnection would apply as compared to the first set, with respect to transposition upon series connection. In this way the voltages from opposite-sided portions of the circuits would be caused to add, rather than to cancel.

While the suggested application described here is to an electromechanical battery, the same technique could be applied to other electrical machinery, for example, to the design of a much-simplified electric generator/motor, where one set of the windings provides magnetic levitation, while the other acts as the windings of a generator motor, coupling to a rotating Halbach array. In such a case it could be advantageous to invert the structural arrangement. This radially-inverted rotating Halbach array 20 (field maximized on the outside of the array) would be located inside of a dual set of stationary windings 72 that provide both levitation and energy coupling. In either case it would also be necessary to provide axial centering, for example, using permanent-magnet elements such as those described in the incorporated patents, or employing a third set of windings 30 as described below.

As shown in the attached FIGS. 1A and B, the EMB consists of a cylindrical ring of high-strength material (for example, fiber composite 10) on the inner surface of which are located the magnets 12 of an even order (4, 6, 8, etc.) multi-pole Halbach array that could run the full length of the rotor. Inside of this array is a thin-walled vacuum barrier 14 made of insulating material, and inside of this barrier are disposed two types of windings. One winding set 16 is the one that performs the levitation. Its configuration is based on the concepts described in U.S. Pat. No. 5,495,221. The second winding set 18 may be a single phase or a multi-phase winding. It is configured so as to couple efficiently to the Halbach array, while minimizing sideways forces. That is, the windings on one side are connected to matching windings on the opposite side so that their voltages add, while their transverse forces cancel.

The levitating windings 16, since they are located in the upper and lower quadrants of the winding array, produce centering forces characterized by asymmetric stiffnesses. That is, the stiffness in the vertical direction is greater than that in the horizontal direction. This asymmetry property helps to insure stability against whirl-type modes.

Figure 1C:
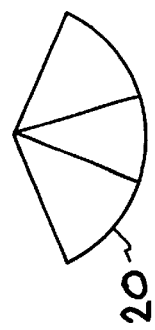
FIG. 1C shows an end view of a levitator pole assembly.
Figure 2C:
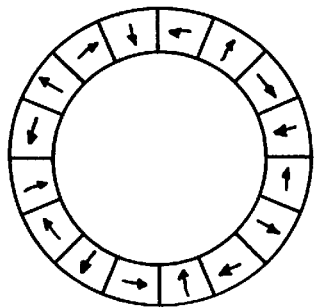
FIGS. 2A–D show an alternate embodiment of the combined passive bearing and Halbach-Array motor/generator where the rotor is tapered at each end.
Figure 2D:
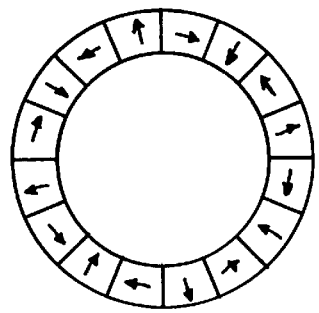
Figure 2A:
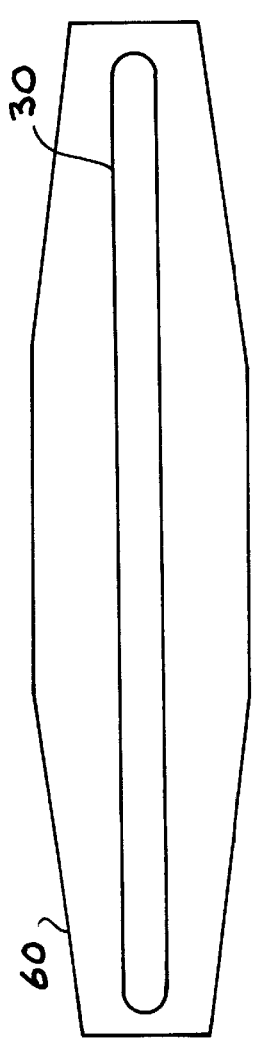
Figure 2B:
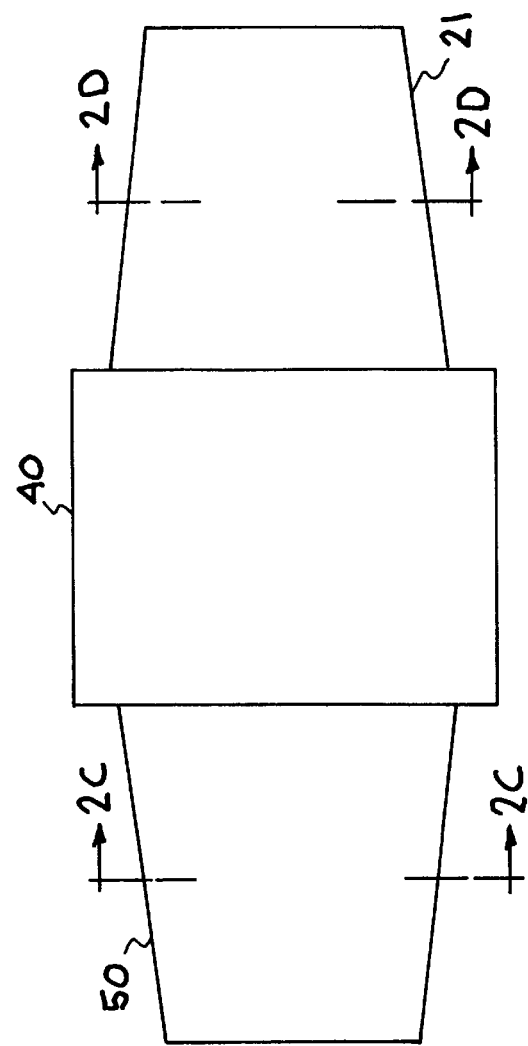
Figure 3:
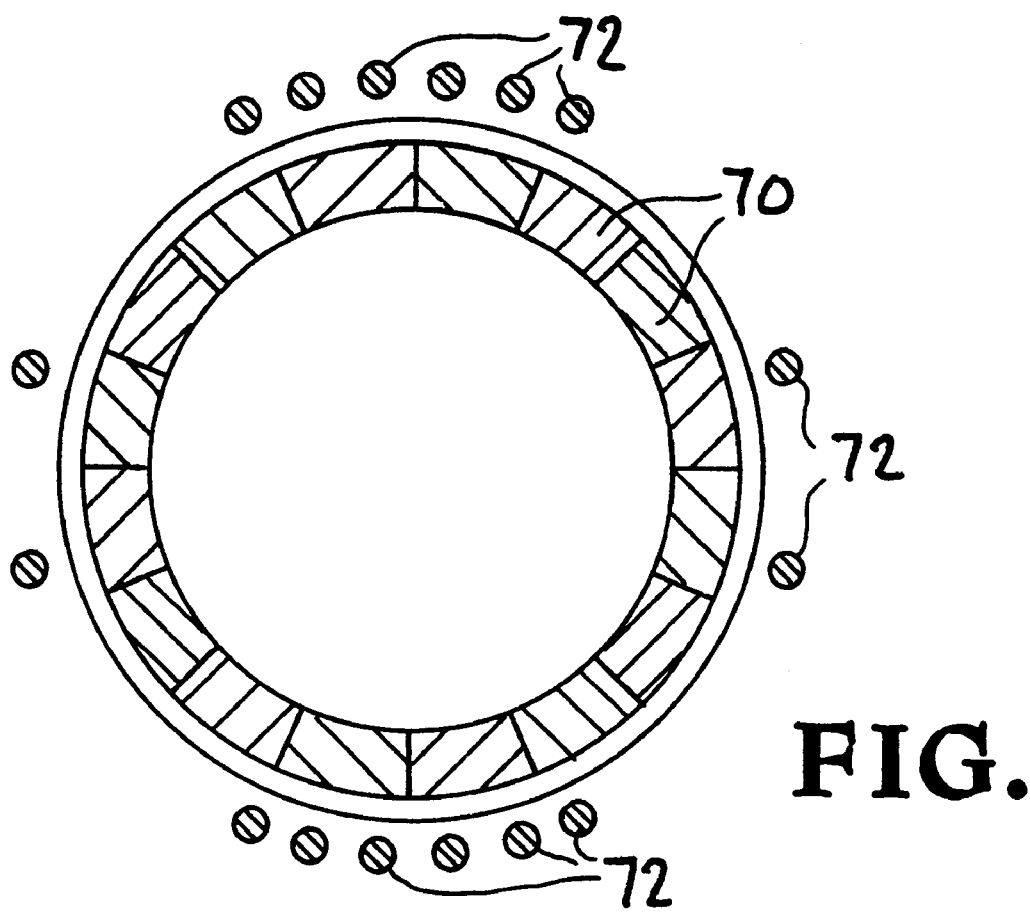
FIG. 3 shows an embodiment of a radially-inverted Halbach array.

In some situations it may be desirable to augment the radially centering force produced by winding set 16 by the levitating force produced by pole faces excited by permanent magnets interacting with magnetic material carried on the rotating elements. An example configuration is shown in FIG. 1A and FIG. 1C. It employs two stationary "pie-shaped" poles 20 with permanent-magnet excitation. These poles interact attractively with two rings 22 of ferromagnetic material that are incorporated in the rotating elements. These rings may either be made of laminated ferromagnetic material or of bonded ferromagnetic powder (to minimize losses from eddy-currents). If the lifting force produced by the two poles approaches that needed to levitate the rotating elements, the function of windings 16 then becomes primarily one of radial stabilization. In this situation the resistive losses of the levitating windings will be minimized, leading to a magnetic suspension/bearing system with very low parasitic losses.

In addition to the levitating windings, which windings produce a radially centering force on the rotating system, a third set of windings, 30, may be incorporated on the stator in those cases where it is desirable to provide additional axial centering forces, or to achieve both axial and radial centering without the need for levitating poles such as those shown in FIG. 1C. FIGS. 2A–D illustrate such an embodiment. In the figure there is shown a configuration having two Halbach arrays 50 and 21, each of which lies on a conical surface, one at each end of the rotor 40. The stator 60, shown separated from the assembly, is correspondingly tapered, and carries three distinctly different winding sets, located at different azimuthal positions around the stator. The first two sets of windings (not shown on the drawing) are those described in the previous embodiment. These winding respectively provide radial centering forces and act as generator/motor windings. The third set of windings 30, a typical one of which is shown on the drawing, are configured so as to link no net flux either in the centered position or for translations of the axis of rotation perpendicular to that axis. One method of accomplishing this result is shown in the figures. As shown by comparing the sectional views of FIGS. 2C and 2D, the azimuthal phase of the two Halbach arrays 50 and 21 is displaced with each other by 180 degrees. In this situation, windings 30, configured as simple loops lying on the surface of the stator will intercept no net flux when the rotating system is centered axially. A similar result could be obtained by employing lap wound windings in the form of a FIG. 8, but now with both Halbach arrays having the same azimuthal phase orientation. In either case, however, for translations parallel to the axis of rotation, this third set of windings will intercept net flux and provide restoring forces in a direction so as to re-center the rotating system axially. Not shown in FIGS. 2A–D are the disengaging mechanical centering bearings required to support and center the rotating system when its speed is below the critical speed required for operation of the two sets of stabilizer windings.

Changes and modifications in the specifically described embodiments can be carried out without departing from the scope of the invention, which is intended to be limited by the scope of the appended claims.

The invention claimed is:

1. An electric machine, comprising:
   a cylindrical rotor comprising an array of permanent magnets that provide an N-pole magnetic field of even order, wherein N=4, 6, 8, etc., wherein said array of permanent magnets comprise bars of identical permanent magnets assembled in a circle, wherein said bars are dipole elements, wherein each bar of said bars has a vector direction of magnetization that rotates at N times the rate as that of a vector rotating about said circle pointing from the center of said N-pole field to the center of said elements; and a stator inserted down the axis of said N-pole field, wherein said stator comprises first set of windings and second set of windings, wherein said first set of windings and said second set of windings are electrically orthogonal in action to each other, wherein said first set of windings provides radial stabilization of said stator and said second set of windings couples to said array of permanent magnets and acts as the windings of a generator/motor, wherein said rotor and said stator are horizontally disposed, wherein said rotor is on the outside of said stator.

2. The electric machine of claim 1, further comprising two rings of ferromagnetic material, wherein a first ring of said two rings is located at a first end of said rotor, wherein a second ring of said two rings is located at a second end of said rotor; and two levitator pole assemblies fixedly attached to a support member external to said electric machine, wherein a first levitator pole assembly of said two levitator pole assemblies magnetically interacts attractively with said first ring to produce a levitating force upon said rotor, wherein a second levitator pole assembly of said two levitator pole assemblies magnetically interacts attractively with said second ring to produce a levitating force upon said rotor.

3. The electric machine of claim 1, wherein a voltage induced in a first half of said first set of windings to exactly cancels another voltage induced in a second half of said first set of windings so that no current flows when the axis of said array of permanent magnets coincides with the axis of symmetry of said first set of windings, wherein voltage cancellation no longer occurs when the axes are displaced from each other and current flows, resulting in a centering action.

4. The electric machine of claim 1, wherein said, second set of windings are interconnected so that their voltages add in phase at an output lead, so that power can be drawn from them, or they can be used as motor windings to spin up said cylindrical rotor to which they are attached.

5. The electric machine of claim 4, wherein said second set of windings are configured to produce a single-phase output.

6. The electric machine of claim 4, wherein said second set of windings are configured to produce a multiple-phase output.

7. The electric machine of claim 1, wherein said cylindrical rotor further comprises a cylindrical ring of high-strength material comprising said array of permanent magnets on its inner surface.

8. The electric machine of claim 7, further comprising a thin-walled stationary vacuum barrier comprising insulating material disposed between the inner surface of said array of permanent magnets and the outer surface of the stator windings.

9. The electric machine of claim 2, wherein said two rings of ferromagnetic material comprise laminated ferromagnetic material.

10. The electric machine of claim 2, wherein said two rings of ferromagnetic material comprise bonded ferromagnetic powder (to minimize losses from eddy-currents).

11. The electric machine of claim 1, wherein said rotor comprises a first tapered portion at a first end and a second tapered portion at a second end, wherein said array comprises a first Halbach array on said first tapered portion, wherein said array comprises a second Halbach array on second tapered portion, wherein the azimuthal phase of said first Halbach array is displaced by 180 degrees with respect to said second Halbach array, wherein said stator comprises a third set of windings incorporated onto said stator to provide additional axial centering forces, wherein said third set of windings is configured to link no net flux either in the centered position or for translations of the axis of rotation perpendicular to that axis but to link flux upon axial displacements to provide restoring forces that re-center the rotating system axially.

12. The electric machine of claim 1, wherein said rotor comprises a first tapered portion at a first end and a second tapered portion at a second end, wherein said array comprises a first Halbach array on said first tapered portion, wherein said array comprises a second Halbach array on second tapered portion, wherein the azimuthal phase of said first Halbach array is not displaced with respect to said second Halbach array, wherein said stator comprises a third set of windings incorporated onto said stator to provide additional axial centering forces, wherein said third set of windings is configured to link no net flux either in the centered position or for translations of the axis of rotation perpendicular to that axis but to link flux upon axial displacements to provide restoring forces that re-center the rotating system axially.

13. The electric machine of claim 1, wherein said first set of windings comprise rectangular "window frames" and lie transversely across said stator.

14. The electric machine of claim 1, wherein said stator comprises a stator support structure, wherein said first set of windings are lap-wound and lie on the surface of said stator support structure.

15. An electric machine, comprising:

a cylindrical rotor comprising an array of permanent magnets that provide an N-pole magnetic field of even order, wherein N=4, 6, 8, etc., wherein said array of permanent magnets comprises bars of identical permanent magnets assembled in a circle, wherein said bars are dipole elements, wherein each bar of said bars has a vector direction of magnetization that rotates at N times the rate as that of a vector rotating about said circle pointing from the center of said N-pole field to the center of said elements, wherein the direction of rotation of the dipole elements relative to the vector rotating about said circle is such that said N-pole field is maximized outside of said array; and a stator surrounding said N-pole field, wherein said stator comprises a first set of windings and a second set of windings, wherein said first set of windings and said second set of windings are electrically orthogonal to each other, wherein said first set of windings provides stabilization of said stator and said second set of windings couples to said array of permanent magnets and acts as the windings of a generator/motor, wherein said rotor and said stator are horizontally disposed, wherein said stator is on the outside of said rotor.

* * * * *